June 4, 1957 E. P. WENZELBERGER 2,794,327
APPARATUS FOR DEHYDRATION OF LIQUIDS BY FREEZING
Filed Feb. 2, 1955 2 Sheets-Sheet 2
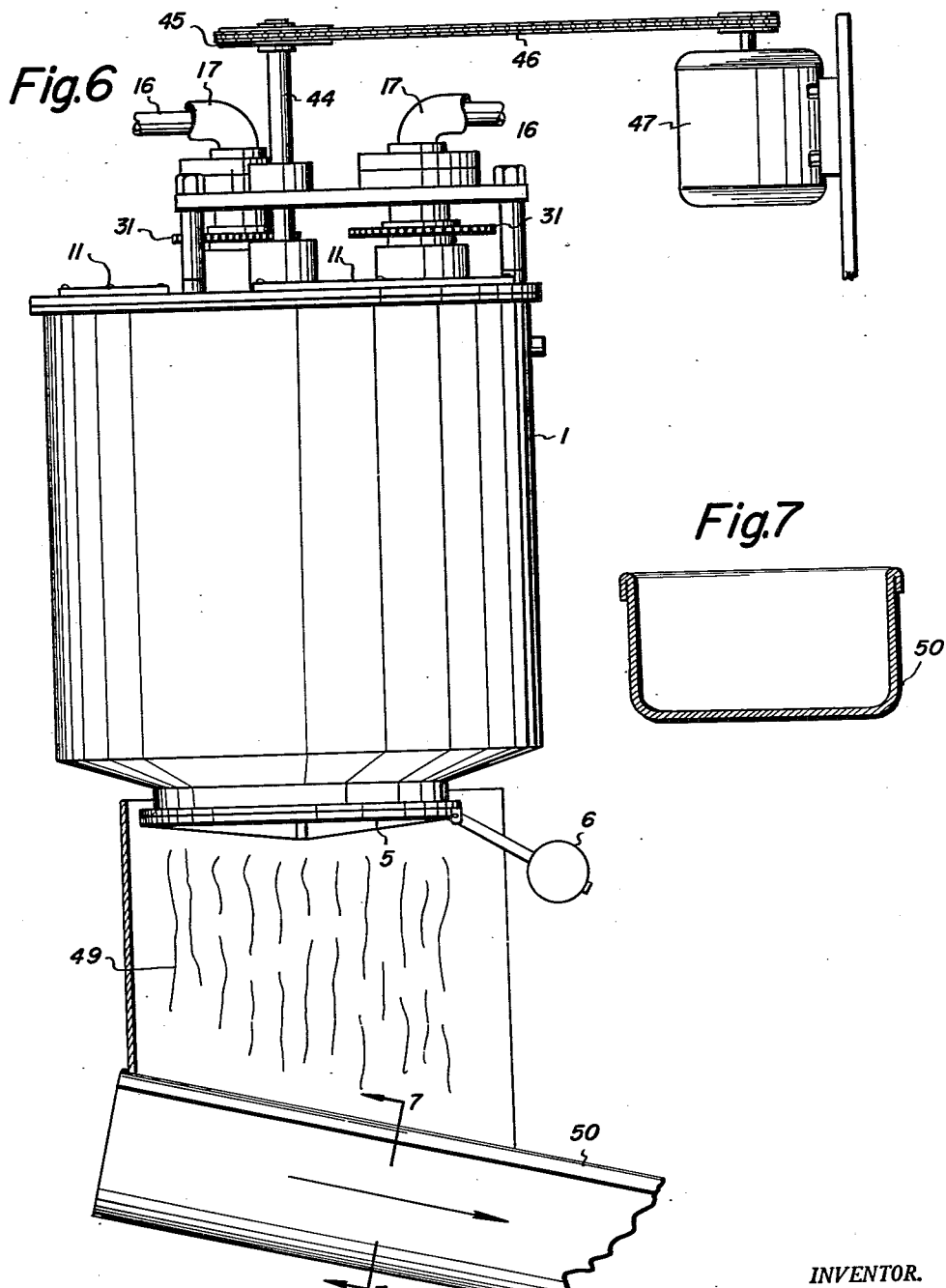
INVENTOR.
ELWOOD P. WENZELBERGER
BY
Attorneys

United States Patent Office 2,794,327
Patented June 4, 1957

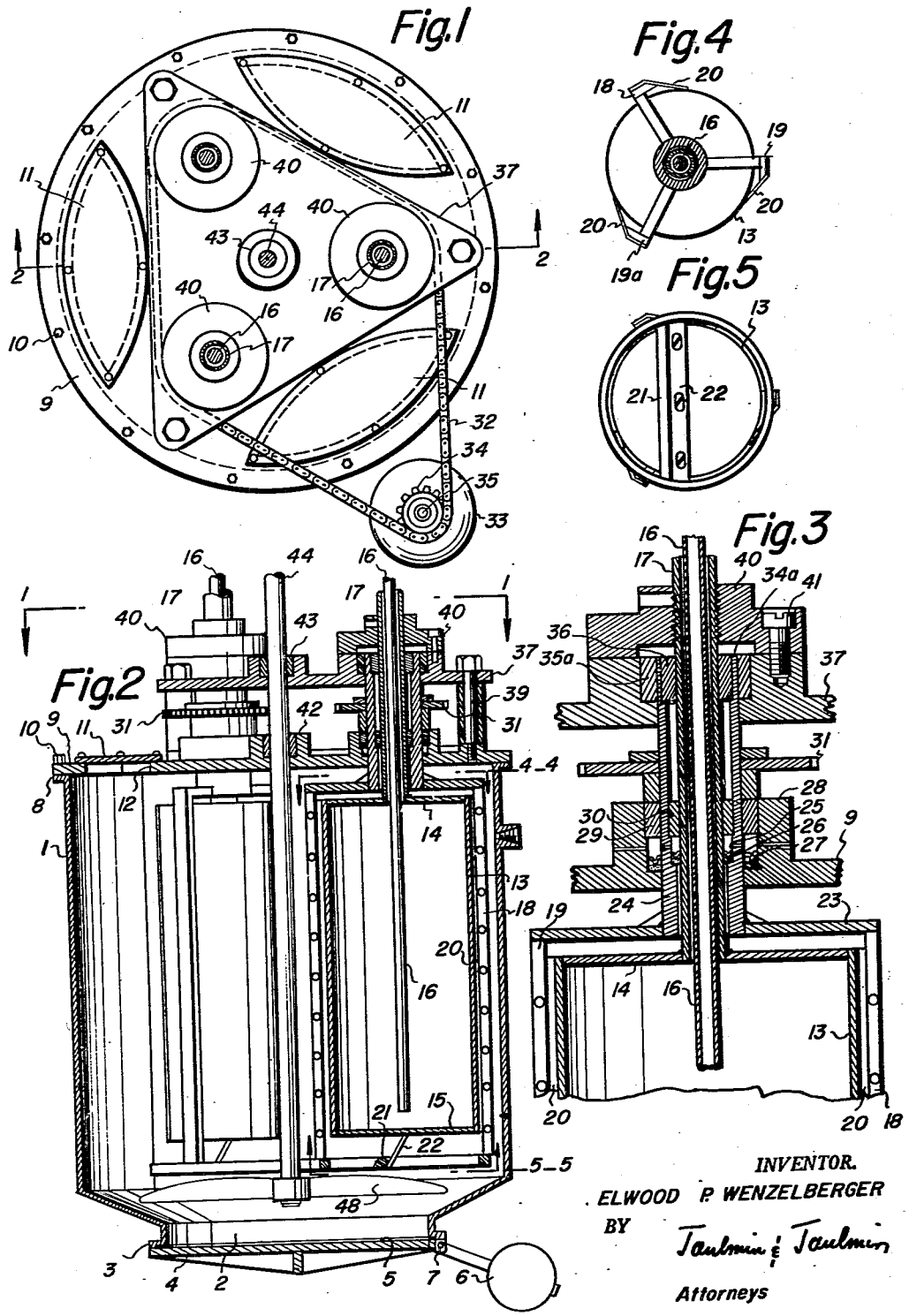

2,794,327

APPARATUS FOR DEHYDRATION OF LIQUIDS BY FREEZING

Elwood P. Wenzelberger, Dayton, Ohio, assignor to The Commonwealth Engineering Company of Ohio, Dayton, Ohio, a corporation of Ohio Application February 2, 1955, Serial No. 485,683

9 Claims. (Cl. 62—114)

My invention relates to an apparatus for dehydration of heat sensitive liquid bearing solids.

It is an object to provide an apparatus that is clean with respect to the refrigerated surfaces and which provides means of distributing refrigeration throughout the body of the liquid bearing solids so as to distribute the refrigeration therethrough for uniform freezing.

It is an object of this apparatus to freeze the water in the solution bearing the solids in the form of fine crystal ice and to distribute the crystals entirely throughout the entire mass to bring about reseeding and therefore extension of the crystal growth.

It is a further object of the invention to provide means for placing the contents under agitation so as to continually move the contents over the refrigerated areas while keeping the refrigerated areas clear of any adhering ice.

It is a further object to provide such an agitating means, which, when the bottom of the tank is open for discharge, will drive the contents downwardly through the opening and assist the force of gravity as the contents in the tank is usually in the form of a frozen slush.

It is an object to provide a stirrer which acts as a propeller in opposite directions without reversal of the propeller.

It is an object to provide for the propeller to drive the contents downwardly and thence upwardly when the bottom of the tank is closed and downwardly and outwardly when the bottom of the tank is open.

It is an object to provide an exit opening at the bottom of the tank substantially the diameter of the propeller so that the exit of the slush will be in such a body that there will be no movement through the rearward exit to cause the ice particles to concentrate and entrap the solids from which they have been once separated by freezing.

It is an object to provide a plate valve so that upon opening of the bottom of the tank there will be no reaction to the immediate movement of the entire mass within the tank.

It is an object to provide for simultaneous movement of the stirrer and scraper adjacent the refrigerated surfaces distributed throughout the interior of the tank and in independent movement for that purpose, the speed of which has to be adjusted according to the nature of the material and the extent of their freezing.

It is an object to provide means of dumping substantially, as a continuous body, the entire contents of the tank that has been partially frozen and of permitting the contents to separate in descent to be collected in a dump so that the movement of the frozen body will tend to separate the ice from the remaining solids and liquids to permit easier further processing of the remaining liquids and solids for further dehydration.

Referring to the drawings:

Figure 1 is a top plan view of the assembly. This view is partially in section of the line 1—1 of Figure 2 looking in the direction of the arrows;

Figure 2 is a section on the line 2—2 of Figure 1;

Figure 3 is a detailed view of the refrigerant circulation mechanism, the bearings and the supports, as well as the support for the scraper mechanism traveling about the surface of the tubular refrigeration means;

Figure 4 is a section on the line 4—4 of Figure 2;

Figure 5 is a bottom plan view of one of the refrigeration cylinders and the scraper therefor;

Figure 6 is a side elevation of the complete apparatus indicating the relationship between the valve mechanism and the collecting dump in which the contents of the tank descend;

Figure 7 is a section on the line 7—7 looking in the direction of the arrows to illustrate the general construction of the dump.

It will be understood that one of the requirements of an apparatus of this type is that there be no contamination of the liquid within the tank; that the tank itself, its refrigeration apparatus and stirrer mechanism may be easily removed and cleaned in order to meet the requirements of various state and federal regulatory bodies, and there be no surfaces exposed for the accumulation of any foreign matter which cannot be readily removed by ordinary cleaning.

It is further important to be able to remove the tank on the one hand and the refrigeration apparatus and the stirrers on the other. In the instant case the tank can be removed from the refrigeration apparatus and the stirrers or vice versa. This permits a thorough and quick cleaning.

Referring to the drawings in detail, 1 is a tank having a bottom opening 2 surrounded by a shoulder 3 having a sealing gasket 4 for engagement with the plate valve 5 which is held in position either hydraulically or by a spring or a mechanical means such as a head, as indicated at 6, this valve is preferably hinged at 7. It will be understood that a wide variety of valve makes may be used, as long as there is complete and ready dumping of the contents of the tank.

The top of the tank is provided with a ring flange 8 to which is bolted a cover 9 by the bolts 10. This cover is provided with a transparent closure 11 over the opening 12 in the cover 9 to permit observation of the interior of the tank 1.

This cover, as hereinafter described, supports a plurality, in this case 3 in number, of refrigerating tubes having side walls 13, a cover 14 and a bottom 15. The side walls are relatively thicker than the top and bottom walls.

The refrigerant is introduced into the bottom of each of these tubes through the pipe 16 and makes its exit through the pipe 17 at the top of the tube where it is mounted upon the cover 14. The pipe 16 is located concentrically within, but spaced from, the tube 17. In this manner, the refrigerant, either primary or secondary, can be circulated through the tubes and to and from the tube 13.

In order to prevent any accumulation of ice upon the surfaces of the tubes, there is provided a scraper mechanism consisting of the following; a plurality of vertical scrapers 18, 19 and 19a which carry nylon scraper surfaces 20 which engage the stainless steel walls 13. These scrapers 18, 19, 19a have a cross member 21 carrying a nylon scraper 22 for scraping the bottom of the refrigerating tube (see Figure 5). This entire scraper assembly is supported on a transverse support 23, which in turn is carried on the sleeve 24. The interior of this sleeve is recessed at 25 to receive the seal 26 on the exterior of the sleeve 24 for a second seal 27, carried with the recess cup 28 forming a part of the top plate 9. Bearing members 29 and 30, on the outside and inside of the sleeve 24 maintain it in alignment. Mounted on the exterior of the sleeves is a sprocket 31, driven by the chain 32 from the motor 33, which is equipped with a sprocket 34 on its armature shaft 35. This chain drives all of the stirrers in synchronism. The upper end of the sleeve 24 terminates in a recess bearing portion 34a between the two bearings 35a and 36 respectively, bearings 30 and 36 engaging the tube 17 for supplying refrigerant to the upper plate 37. This upper plate is mounted on extension studs 39 on the top of the cover 9. It forms a support for these upper bearings and a support for the tube 17, which is threaded to the cap plate 40, mounted on the top of the plate 37 and attached thereto with screws 41. This entire assembly supports the refrigerating tubes and supply pipes, the stirrer mechanism and the driving mechanism for the stirrer mechanism.

It will be obvious that the bearings are sealed from the interior of the tank so that no lubricant can contaminate the contents of the tank.

There is mounted in the cover 9, and the upper plate 37 suitable bearings 42 and 43 respectively, the propeller shaft 44, the upper end of which is driven through a sprocket 45 and chain 46 from the motor 47. While I have shown separate motors for driving the scrapers and the propeller, it will be understood that a single motor can be employed.

The propeller shaft 44 carries at its lower end a propeller 48 of approximately the same diameter as the opening 2 in the bottom of the tank. When that opening is closed the contents of the tank are driven by the propeller downwardly and are then deflected upwardly over the refrigerating tubes. Usually the propeller travels at a much higher speed than the scrapers. When the valve 5 is opened the propeller assists in the rapid discharge of the contents and any ice adhering to the surface of the tubes is scraped away and dumped downwardly in the path of the scraper to be further discharged.

The discharge as indicated at 49 is dumped into the U-shaped chute 50. In this way the ice and remaining liquid and solids freely separate from one another and pass down the chute for separation by a screen or centrifuge. Practical experience has taught that piping should be eliminated because it tends to consolidate the ice around the solids and entrap the unfrozen liquid which is the very object of this apparatus to prevent. By utilizing the scraper to assist the force of gravity, and by utilizing a large opening and dumping the contents into the open trough instead of first a pipe, the results of refrigerating tanks can be preserved and even improved upon.

It will be understood in the operation of this apparatus that it is important to distribute the refrigerated surfaces through the mass. This is accomplished by a plurality of depending refrigerating tubes. It is also important not only to prevent ice from adhering to these tubes, but also to stir the contents of the tank. It is important to return the ice which will settle by reason of its weight to the bottom of the tank, upwardly to the top of the tank so that the liquid and ice continuously cascade over the refrigerating tubes from top to bottom. In the art of crystallization of water from the liquid bearing the solids, it has been found that the movement of the crystals brings about very rapid freezing and after a short period a sudden crystallization through the entire mass providing large numbers of very fine crystals which are free of solids and have no tendency to adhere or stick to the solids. The continued replacement of the refrigerant, particularly when a secondary refrigerant such as dyethylene glycol is used permits the maintaining of a uniform temperature within the tubes.

It will be noted that the entire apparatus is readily disassembled in separate units so that it can be removed and cleaned. There is no stainless steel surface bearing upon one another to cause wear of the steel and discoloration of the liquid and there are no threaded portions to accumulate bacteria and make cleaning difficult. The lubrication and any dripping from the driving mechanisms are completely excluded from the interior of the tank.

As set forth in my copending applications, Serial No. 153,806, filed April 4, 1950, now United States Patent No. 2,657,549; and 106,576, filed July 25, 1949, now United States Patent No. 2,559,204, I utilize this improved mechanism in the practice of this process of freezing by stages.

The present application is a continuation-in-part of my application Serial No. 196,686, now U. S. Patent No. 2,723,539.

It will be understood that I desire to comprehend, by the hereinafter appended claims, such modifications of construction as may be necessary to adapt it to varying conditions of use.

What is claimed is—

1. In a refrigeration apparatus, a tank, a plurality of spaced refrigerated tubes disposed within said tank, means for circulating refrigerant to and from the interior of the said tubes, a cover on said tank, said cover supporting said tubes and refrigerant supply means, scraper means arranged in said tank for traveling over the outer side and bottom wall surfaces of said refrigerated tubes for preventing ice from collecting thereon, means on said cover for supporting and driving said scraper means, said scraper means lightly engaging the outer wall surfaces of said refrigerating tubes and means for driving in unison said scraper means adjacent each of said tubes.

2. As a new article of manufacture for use as a scraper for a refrigerated cylindrical surface, scraper mechanism comprising a supporting member and blade means removably mounted thereon for simultaneously scraping the side wall and bottom of said cylindrical refrigerated surface, said scraper blades being made of nylon.

3. In combination, in a refrigerating tank, a tubular support, a plurality of tubular refrigerating means disposed in the interior of said tank, a tubular feed means extending into the interior of said refrigerating means and terminating adjacent to the bottom of the tubular refrigerating means, a tank cover adapted to support said tubular refrigerating means, a scraper assembly carried by said cover and mounted to engage the sides and bottom of said tubular refrigerating means, and bearing means mounted both on the inside and outside of the tubular extension of said scraper means, concentric with the supply tubes for the tubular refrigerating means, and said bearing means being disposed between said cover support and said scraper support and between the scraper support and the tubular means for conducting refrigerant to the supply tubes.

4. As a new article of manufacture comprising a refrigeration mechanism consisting of a tubular refrigerating means, concentric piping communicating to the top and bottom of the interior of the said tubular means for circulating the refrigerant therethrough, and a revolvable scraper assembly arranged concentric with said tubular supply pipes and supported therewith and movable relative thereto in spaced relationship, said scraper assembly comprising a scraper having blade means for movement over the sides and bottom of said tubular refrigerating means.

5. In a refrigeration mechanism, comprising tubular refrigerating means, scraper means movable over the outer side wall and bottom wall surfaces of said tubular refrigerating means, means to support said scrapers, tubular communicating means for the interior of said refrigerating means, bearing means for said scrapers and supported above said tubular means, means to seal the connection between said support and said tubular means, and means to prevent leakage of lubricant from said bearing means.

6. In a refrigeration mechanism, means comprising a container for holding material to be refrigerated, said container having an inlet and an outlet opening for admitting material to be refrigerated, means comprising a refrigerant container disposed within said first container for receiving refrigerant, means comprising a scraper movable over the outer side and bottom wall surfaces of said refrigerant container, and means for supporting said scraper on the top of said container and in position for movement over the said outer surfaces of said refrigerant container to prevent the formation of ice crystals thereon.

7. In a refrigeration mechanism, means comprising a container for holding material to be refrigerated, said container having an inlet and an outlet opening for admitting material to be refrigerated and discharging the same, means comprising a refrigerant container disposed within said first container for receiving refrigerant, means comprising a scraper movable over the outer side and bottom surface of said refrigerant container, means for supporting said scraper for movement over said wall surfaces of said refrigerant container whereby the formation of ice crystals thereon is prevented, said scraper means having side and bottom portions for extending over and contacting the outer side and bottom wall surfaces of said refrigerant container, and means for agitating the material in said refrigerant container.

8. In a refrigeration mechanism, means comprising a container for holding material to be refrigerated, a plurality of tubular refrigerating members supported within said container for receiving refrigerant circulated therethrough, scraper means comprising blades arranged on top of said container with said blades in position for movement over the outer side and bottom walls of said tubular refrigerating members to prevent the formation of ice thereon, and means for driving said scraper means to move the same over said tubular members, said scraper blades being composed of synthetic organic fiber.

9. In a refrigerating apparatus, a tank having a major portion of the bottom open, a cover over the top of said tank, a plurality of refrigerating tubes mounted in said tank, a shaft extending into said tank, a propeller stirrer mounted on said shaft, means to drive the propeller shaft, scraper means carried by said tank cover for scraping the outer side wall and bottom wall surfaces of said refrigerating tubes, said scraper means comprising blades composed of nylon, bearing means for supporting said scrapers and mounted on said cover, and means arranged adjacent said bearings to prevent leakage of lubricant therefrom and contaminating the interior of said tank.

References Cited in the file of this patent

UNITED STATES PATENTS

| | | |
|---|---|---|
| 490,475 | Holden | Jan. 24, 1893 |
| 530,527 | Holden | Dec. 11, 1894 |
| 1,020,759 | Holden | Mar. 19, 1912 |
| 1,954,518 | Downer | Apr. 10, 1934 |
| 2,005,733 | Field | June 25, 1935 |
| 2,066,431 | Taylor | Jan. 5, 1937 |
| 2,150,792 | Willat | Mar. 14, 1939 |
| 2,372,630 | Smith | Mar. 27, 1945 |
| 2,467,933 | Gruhn | Apr. 19, 1949 |
| 2,519,946 | Voelker | Aug. 22, 1950 |
| 2,556,691 | Harshbarger | June 12, 1951 |
| 2,585,020 | Lessard | Feb. 12, 1952 |

OTHER REFERENCES

Complete Home Workshop, May 1948, page 139.